United States Patent [19]

Takada

[11] Patent Number: 5,371,631
[45] Date of Patent: Dec. 6, 1994

[54] WIDE ANGLE ZOOM LENS SYSTEM
[75] Inventor: Katsuhiro Takada, Tokyo, Japan
[73] Assignee: Olympus Optical Co., Ltd., Tokyo, Japan
[21] Appl. No.: 999,721
[22] Filed: Dec. 31, 1992
[30] Foreign Application Priority Data

Jan. 6, 1992 [JP] Japan .................. 4-000018

[51] Int. Cl.⁵ ............................................. G02B 15/14
[52] U.S. Cl. ............................... 359/689; 359/691; 359/692; 359/784
[58] Field of Search ............... 359/689, 784, 691, 692

[56] References Cited

U.S. PATENT DOCUMENTS 5,000,549 3/1991 Yamazaki ..................... 359/691

FOREIGN PATENT DOCUMENTS 63-25613 2/1988 Japan .
64-72114 3/1989 Japan .
03208004 9/1991 Japan .

*Primary Examiner*—Loha Ben
*Assistant Examiner*—Michael A. Papalas
*Attorney, Agent, or Firm*—Cushman, Darby & Cushman

[57] ABSTRACT

The invention provides an ultra-wide zoom lens system that has a very wide angle coverage, as indicated by a field angle change of about 92° to about 65°, is bright, as indicated by an F-number of 4.5 at the telephoto end, and is relatively simple in lens unit construction, and consists of, in order from the object side, a first lens unit I of negative refracting power, a second lens unit II of positive refracting power and a third lens unit III of negative refracting power, all said lens units being moved toward the object side for wide angle to telephoto zooming. The zoom lens system then conforms to Conditional Formulae (1), (2) and (3):

$$-6.5 < f_1/f^T < -1.5 \quad (1)$$

$$0.4 < f_2/f^T < 1.0 \quad (2)$$

$$0.8 < e_1^W/e_1^T < 1.2 \quad (3)$$

where $f_1$ and $f_2$ are the focal lengths of the first and second lens units, respectively, $f^T$ is the focal length of the overall lens system at the telephoto end, and $e_1^W$ and $e_1^T$ are the spaces between the principal points of the first and second lens units at the wide angle and telephoto ends, respectively.

5 Claims, 14 Drawing Sheets

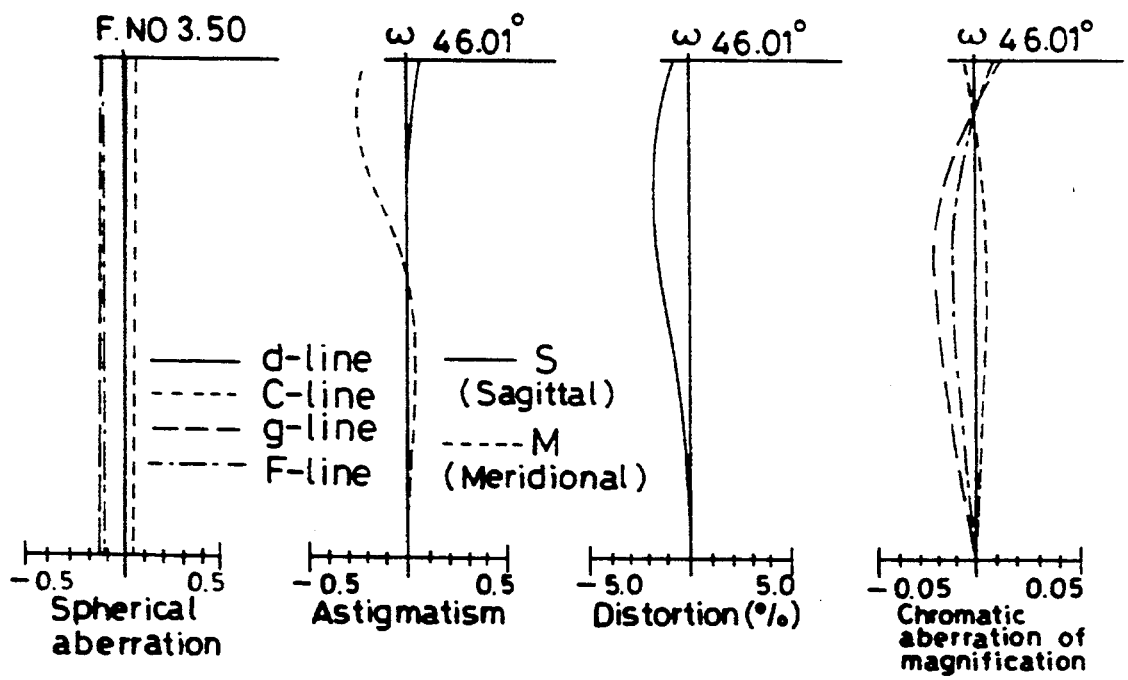
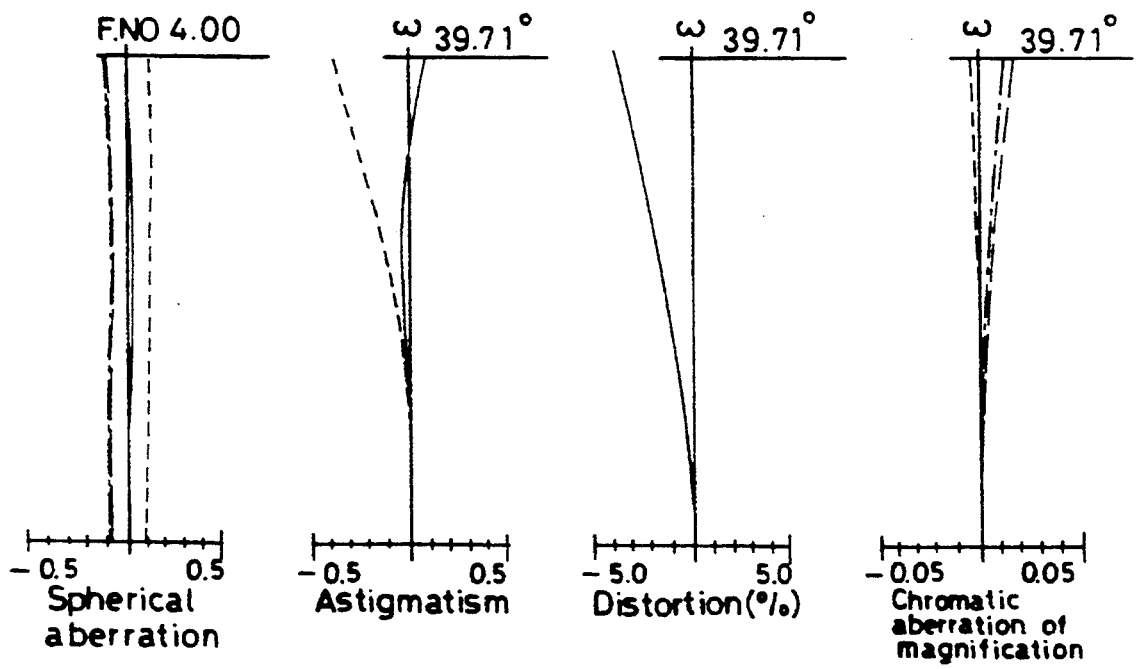

F.NO 4.50

-0.5　0.5
Spherical aberration

ω 32.66°

-0.5　0.5
Astigmatism

ω 32.66°

-5.0　5.0
Distortion(%)

ω 32.66°

-0.05　0.05
Chromatic aberration of magnification

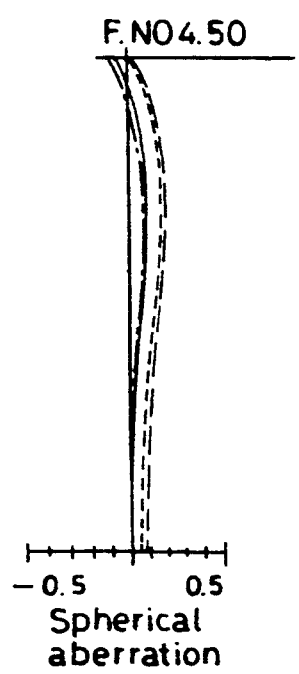 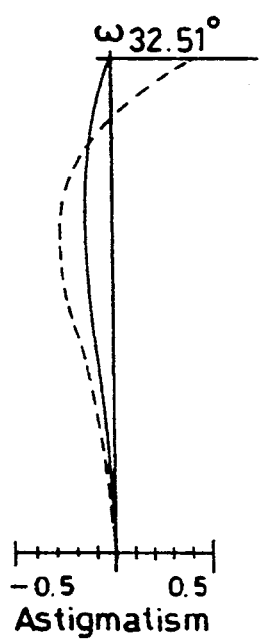 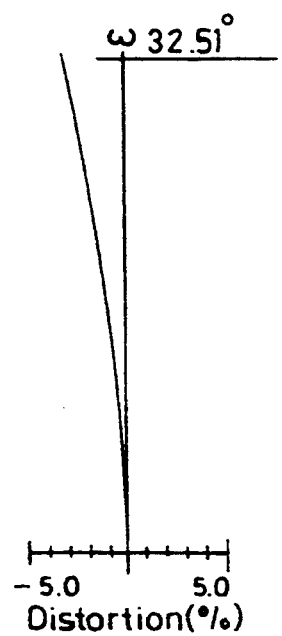 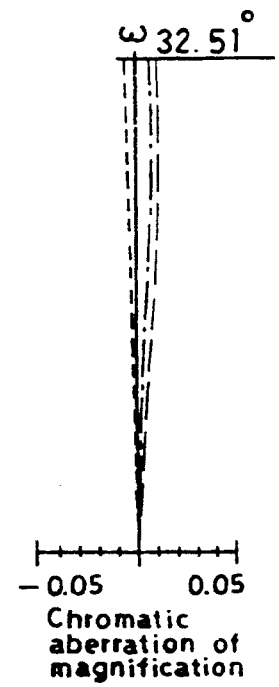

F.NO 3.50
Spherical aberration

ω 46.10°
Astigmatism

ω 46.10°
Distortion (%)

ω 46.10°
Chromatic aberration of magnification

F.NO 4.00
Spherical aberration

ω 39.72°
Astigmatism

ω 39.72°
Distortion (%)

ω 39.72°
Chromatic aberration of magnification

Spherical aberration

Astigmatism

Distortion(%)

Chromatic aberration of magnification

F.NO 3.50

-0.5  0.5
Spherical
aberration

ω 46.04°

-0.5  0.5
Astigmatism

ω 46.04°

-5.0  5.0
Distortion(%)

ω 46.04°

-0.05  0.05
Chromatic
aberration of
magnification

F.NO 4.00

-0.5  0.5
Spherical
aberration

ω 39.66°

-0.5  0.5
Astigmatism

ω 39.66°

-5.0  5.0
Distortion(%)

ω 39.66°

-0.05  0.05
Chromatic
aberration of
magnification

F.NO 4.50

−0.5　0.5
Spherical aberration

ω 32.47°

−0.5　0.5
Astigmatism

ω 32.47°

−5.0　5.0
Distortion(%)

ω 32.47°

−0.05　0.05
Chromatic aberration of magnification

F.NO 3.50
−0.5   0.5
Spherical aberration

ω 46.04°
−0.5   0.5
Astigmatism

ω 46.04°
−5.0   5.0
Distortion (%)

ω 46.04°
−0.05   0.05
Chromatic aberration of magnification

F.NO 4.00
−0.5   0.5
Spherical aberration

ω 39.67°
−0.5   0.5
Astigmatism

ω 39.67°
−5.0   5.0
Distortion (%)

ω 39.67°
−0.05   0.05
Chromatic aberration of magnification

F.NO 4.50
−0.5   0.5
Spherical aberration

ω 32.51°
−0.5   0.5
Astigmatism

ω 32.51°
−5.0   5.0
Distortion(%)

ω 32.51°
−0.05   0.05
Chromatic aberration of magnification

WIDE ANGLE ZOOM LENS SYSTEM

BACKGROUND OF THE INVENTION

The present invention relates generally to a wide angle zoom lens system, and more particularly to an ultra-wide angle zoom lens system that is designed for use on cameras, etc.

In order that compact cameras which serve multiple functions but in which weight is given on portability are used in enlarged photographic ranges, zoom lenses are generally built in them. A zoom lens best known for this purpose has a standard focal length, as expressed in terms of a field angle of about 47°, and achieves a field angle change of about 65° to about 35.4° in association with zooming. In order that such cameras are used in more enlarged photographic ranges, not a few zoom lenses having increased wide angle or telephoto zooming zones are now being designed. However, the wide angle zooming zone is smaller in extent than the telephoto zooming zone. Moreover, even with cameras with the so-called wide angle zoom lenses built in them—in which the focal length change is limited to the wide angle zone, the field ranges at the wide angle end lie chiefly at about 65° to about 72°. These zoom lenses are not said to well cover photographic ranges for panoramic photography, and so much is desired as to wide angle functions. Zoom lenses having a field angle exceeding about 72° are larger in field angle changes, when compared with focal length variations, and so are greatly promising as zoom lenses that have some remarkable effect on image formation even at a small zoom ratio. For instance, a zoom lens that changes in focal length from 21 to 35 mm has a zoom ratio as low as 1.67 but shows a large-enough field angle change of about 92° to about 65°, and so seems to be promising in a sense of enlarging a photographic range.

Generally, a zoom lens to be incorporated in a compact camera is designed as a two-unit type making use of a so-called telephotographic type of positive and negative power arrangement, as viewed from the object side, in order to reduce the overall lens length. In order to enable this type of two-unit zoom lens to achieve a well-enough back focus, however, it is required that the positive power of the first lens unit be increased and the space between the principal points of the second lens unit be reduced as well, causing the first lens unit that is large in the heights of on-axial rays to produce excessive aberrations. This renders it very difficult to make a bright lens system, and particularly limits the F-number at the telephoto end to 5.6 or more. When it is intended to reduce the focal length at the wide angle end and thereby enlarge the field angle, it is necessary to increase the positive power of the first lens unit further and decrease the negative power of the second lens unit. This renders it more and more difficult to achieve a well-enough back focus, and makes the angle of inclination of off-axial rays incident on the first lens unit so large that the first lens unit generates excessive off-axial aberrations. Moreover, the angle of inclination of off-axial rays leaving the first lens unit is so large that the outer diameter of the second lens unit is imperatively increased.

For the reason mentioned above, it is proposed to dispose an additional lens unit of negative power on the object side of the two-unit type of positive and negative zoom lens to make an arrangement of three, say, negative, positive and negative powers, thereby increasing the aperture of the lens system and achieving a wide angle zooming zone, as typically set forth in JP-A-63-25613 and 64-72114. In one example of the former, there is disclosed a lens system that is bright, as indicated by an F-number of about 4.5 at the telephoto end. However, the focal length at the wide angle end is limited to about 35 mm. In one example of the latter, a lens system having a zoom ratio increased to about 3 is disclosed. However, this system is dark at the telephoto end, as indicated by an F-number of 5.5 or more, and the focal length at the wide angle end is limited to about 28 mm.

A typical zoom lens having a field angle at the wide angle end that is enlarged to about 92° is set forth in Example 4 of JP-A-3-208004. The system comprises, in order from the object side, a first lens unit of positive refracting power, a second lens unit of negative refracting power, a third lens unit of positive refracting power and a fourth lens unit of negative refracting power, and uses a very large number of, say, 14 lenses with a complicated zooming mechanism. Hence, this has an overall lens length so long and varies so considerably in the location of the entrance pupil during zooming, that the first lens unit is increased in outer diameter. Thus, this lens system does not only lend itself fit for use in a compact camera, but is also dark at the telephoto end in particular, as indicated by an F-number of 4.5 to 5.6.

SUMMARY OF THE INVENTION

With the above considerations in mind, an object of the invention is to provide an ultra-wide angle zoom lens system that is well operable in a very wide angle range, as indicated by a field angle change by zooming of about 92° to about 65°, is bright at the telephoto end, as indicated by an F-number of 4.5, and is relatively simple in lens unit construction.

According to the invention, the object mentioned above is accomplished by the provision of a wide angle zoom lens system, which consists of, in order from the object side, a first lens unit of negative refracting power, a second lens unit of positive refracting power and a third lens unit of negative refracting power, all said lens units being moved to the object side for wide-angle-to-telephoto zooming, and which conforms to the following conditional formulae (1), (2) and (3):

$$-6.5 < f_1/f^T < -1.5 \tag{1}$$

$$0.4 < f_2/f^T < 1.0 \tag{2}$$

$$0.8 < e_1{}^W/e_1{}^T < 1.2 \tag{3}$$

where $f_1$ and $f_2$ are the focal lengths of the first and second lens units, respectively, $f^T$ is the focal length of the overall lens system at the telephoto end, and $e_1{}^W$ and $e_1{}^T$ are the spaces between the principal points of the first and second lens units at the wide angle and telephoto ends, respectively.

In what follows, reference will be made to why the construction mentioned above is adopted and how it acts.

In order to construct an ultra-wide angle, bright zoom lens that can be built in a compact camera without making use of a complicated lens arrangement, it is preferable in the invention that an additional lens unit of negative refracting power is disposed on the outside side of a two-unit type of positive and negative zoom lens arrangement; in other words, the zoom lens system consists of, in order from the object side, a first lens unit of negative refracting power, a second lens unit of positive refracting power and a third lens unit of negative refracting power. With this lens construction, it is possible to reduce the occurrence of off-axial aberrations even when the positive refracting power of the second lens unit is increased for achieving a wide angle coverage, because the first lens unit has a negative power so that there is a decrease in the angle of inclination of off-axial rays that are refracted through the first lens unit and then enter the second lens unit. Moreover, since the negative powers are distributed to the first and third lens units, the refracting power of the third lens unit weakens, so that it can become easy to secure the back focus. Another merit is that it is possible to ward off any increase in the lens outer diameter of the third lens unit, because the angle of inclination of off-axial rays leaving the second lens unit is small.

In the zoom lens system of the invention, it is desired that the space between the first and second lens units be varied for wide angle to telephoto zooming. If the first lent unit serves only a wide angle coverage function, it may then be moved together with the second lens unit. In this case, however, an increased image surface variation occurs in the course of wide angle to telephoto zooming, so that the image surface tilts largely toward the object side at a zoom position that is an intermediate focal length. If the space between the first and second lens unit is enlarged to increase the positive composite refracting power of the first and second lens units, the image surface can then be kept so flat that the image surface can be well corrected from the wide angle to telephoto end. In other words, if the first and second lens units are moved in such a way that once the relative space between the first and second lens units have increased, it decreases through the extreme point, the composite refracting power of the first and second lens units can then be maintained at a proper value at a zoom position lying at the intermediate focal length, whereby the curvature of field can be well corrected from the wide angle to telephoto end. The second and third lens units, on the other hand, are moved in such a way that the relative space therebetween decreases monotonously, as is the case with a conventional two-unit type of zoom lens, and this chiefly serves a zooming function.

In the zoom lens system of the invention, the first, second and third lens units are moved toward the object side such that, for wide angle to telephoto zooming, the relative space between the first and second lens units increases to the extreme point whence it decreases, and the relative space between the second and third lens units decreases monotonously. Shown in FIG. 1 are the basic construction of such a zoom lens system of the invention and orbits on which the respective lens units move from the (a) wide angle end to (b) telephoto end.

Moreover, it is desired that the zoom lens system of the invention conform to the following conditions (1), (2) and (3):

$$-6.5 < f_1/f^T < -1.5 \quad (1)$$

$$0.4 < f_2/f^T < 1.0 \quad (2)$$

$$0.8 < e_1{}^W/e_1{}^T < 1.2 \quad (3)$$

where $f_1$ and $f_2$ are the focal lengths of the first and second lens units I and II, respectively, $f^T$ is the focal length of the overall lens system at the telephoto end, and $e_1{}^W$ and $e_1{}^T$ are the principal point intervals of the first and second lens units I and II at the wide angle and telephoto ends, respectively.

Conditional Formula (1) defines the refracting power of the first lens unit I. Below the lower limit of Formula (1) it is impossible to secure the back focus at the wide angle end, because the refracting power of the first lens unit II becomes too weak. In order to keep various aberrations in a well-balanced state, it is required to decrease the positive refracting power of the second lens unit II, but this makes it difficult to compensate for positive spherical aberration occurring through a negative lens, and causes excessive positive spherical aberration to occur at the telephoto end in particular. Again, it is difficult to achieve curvature-of-the-field and astigmatism corrections at the telephoto end. Above the upper limit of Formula (1) it is difficult to correct large distortion occurring through the first lens unit I, because the refracting power of the first lens unit I becomes too strong. In particular, excessive distortion occurs at a zooming position lying at the intermediate focal length.

Conditional Formula (2) defines the refracting power of the second lens unit II. Below the lower limit of Formula (2) the refracting power of the second lens unit II becomes too strong, thus making it difficult to correct astigmatism at the wide angle end or a curvature of the filed at a zooming position lying at the intermediate focal length. If the upper limit of Formula (2) is exceeded, the refracting power of the second lens unit II becomes weak. Therefore, in order to secure a refracting power through the overall lens system, it is required to weaken the negative refracting power of the first lens unit I, thus resulting in under-correction of spherical aberration. Moreover, a further decrease in the refracting power of the second lens unit II is not preferable, because the refracting power of the first lens unit takes a value so positive that it is particularly difficult to correct off-axial aberrations, especially a curvature of the field.

Conditional Formula (3) defines a variation in the space between the first and second lens unit I and II during wide angle to telephoto zooming. Below the lower limit of Formula (3) the space between the principal points of the first and second lens units I and II at the wide angle end becomes so narrow that the composite refracting power of the first and second lens units I and II becomes weak, thus making it difficult to secure the back focus. When it is intended to keep the refracting powers in a well-balanced state, astigmatism is off balance, resulting in an increased difference between the sagittal and meridional image surfaces. Above the upper limit of Formula (3) the space between the principal points of the first and second lens units I and II at the telephoto end is reduced, and this is advantageous for obtaining an increased zoom ratio. However, there is an undesired chance of the first and second lens units I and II colliding with each other at the telephoto end. Such a collision may be avoided by locating the rear principal point of the first lens unit I and the front principal point of the second lens unit II on the image and object sides, respectively, thereby widening the air space between the first and second lens units I and II. However, there is another need of increasing the refracting powers of the respective lens units, because aberrations should be well balanced with respect to one another. Above the upper limit of Formula (3), however, it is very difficult to keep spherical aberration in a well-balanced state.

In order that the zoom lens system of the invention has well-balanced aberrations form the wide angle to telephoto end, it is desired that the following conditions be satisfied:

$$0.4 < Z_2/Z_3 < 0.6 \quad (4)$$

$$0.3 < e_1^T/f^T < 1.5 \quad (5)$$

$$-0.25 < f_2/f_1 < -0.07 \quad (6)$$

where $Z_2$ and $Z_3$ are the amounts of movement of the second and third lens units II and III during wide angle to telephoto zooming, respectively.

Conditional Formula (4) defines the distribution of the amount of zooming movement to the second and third lens units II and III. Below the lower limit of Formula (4) the amount of movement of the second lens unit II is so reduced that there is a chance of the second and third lens units II and III colliding with each other. In order to avoid this, it is required to widen the space between the principal points of the second and third lens units II and III, thus rendering it difficult to secure the back focus. Above the upper limit of Formula (4) the amount of movement of the second lens unit II is so increased that the overall lens diameter is not only increased but also the space between the principal points of the first and second lens units I and II and the space between the principal points of the second and third lens units I and II are off balance, thus giving rise to an increase in the refracting power of each lens unit and rendering it very difficult to correct spherical aberration and a curvature of the field at the wide angle end.

Conditional Formula (5) defines the space between the principal points of the first and second lens units I and II. Below the lower limit of Formula (5) there is a chance of the first and second lens units I and II colliding with each other at the telephoto end. In this connection, it is noted that the space between the principal points of the first and second lens units I and II at the wide angle end must be reduced so as to maintain the range of Conditional Formula (3). In order to secure the refracting power, the positive refracting power of the second lens unit II should be increased, resulting in degradation of distortion. Above the upper limit of Formula (5), the composite refracting power of the first and second lens units I and II is so increased that the distribution of refracting powers is off balance. This in turn leads to a need of weakening the refracting power of the second lens unit II, giving rise to over-correction of spherical aberration at the telephoto end and making it difficult to correct a curvature of the field.

Conditional Formula (6) defines the distribution of refracting power to the first and second lens units I and II. Below the lower limit of Formula (6) the refracting power of the first lens unit I is so relatively increased that there is a need of increasing the refracting power of the second lens unit II so as to secure the refractive power through the overall lens system. For this reason, the first and second lens units I and II increase in refracting power, primarily giving rise to degradation of spherical aberration at the telephoto end and of distortion at a zooming position lying at the intermediate focal length. Above the upper limit of Formula (6) the refracting power of the first lens unit I is so relatively decreased that difficulty is involved in securing the back focus. In addition, it is difficult to correct spherical aberration occurring through the second lens unit II, resulting in degradation of spherical aberration.

In order that refracting power is properly distributed to the respective lens units of the zoom lens system of the invention and the respective lens units are properly moved for zooming, it is desired that the following conditions (7), (8) and (9) be satisfied:

$$0.75 < Z_1/\Delta f < 1.3 \quad (7)$$

$$0.75 < Z_2/\Delta f < 1.3 \quad (8)$$

$$1.1 < Z_3/\Delta f < 2.0 \quad (9)$$

where $Z_i$ is the amount of movement of the i-th lens unit for wide angle to telephoto zooming, and $\Delta f$ is the amount of a focal length change from the wide angle to telephoto end or $\Delta f = f^T - f^W$ where $f^W$ is the focal length of the overall lens system at the wide angle.

Below the lower limit of Conditional Formula (7) there are chances of the first and second lens units I and II and the second and third lens units II and III colliding with each other at the telephoto end and so there is a need of increasing the refracting power of the third lens unit III and thereby decreasing the amount of movement of the third lens unit III. This then gives rise to an extremely increased curvature-of-the-field variation during wide angle to telephoto zooming. When the upper limit of Formula (7) is exceeded, on the other hand, there is an increase in the size of the overall lens system at the telephoto end and it is very difficult to correct spherical aberration and distortion, because the refracting power of the first lens unit I in particular decreases.

Below the lower limit of Conditional Formula (8) there is a decrease in the amount of movement of the second lens unit II. This in turn makes it necessary to widen the space between the principal points of the second and third lens units II and III, thereby preventing the second and third lens units II and III from colliding with each other at the telephoto end and to increase the refracting power of the second lens unit II, thereby bearing load for zooming, thus resulting an increased curvature-of-the-field variation during wide angle to telephoto zooming. When the upper limit of Formula (8) is exceeded, on the other hand, it is necessary to prevent the first and second lens units I and II from colliding with each other at the telephoto end by weakening the refracting powers of the first and second lens units I and II and widening the space between the principal points thereof. For this reason, it is impossible to obtain the refracting powers of the respective lens units required for correcting spherical aberration and distortion at a zooming position lying at the intermediate focal length.

Below the lower limit of Conditional Formula (9), it is required to achieve a zoom ratio by increasing the refracting power of the third lens unit III, but this gives rise to a decrease in the negative refracting power of the first lens unit I. For this reason, it is difficult to maintain the back focus and to correct variations in spherical aberration and a curvature of the field. When the upper limit of Formula (9) is exceeded, on the other hand, there is a risk of the second and third lens units II and III colliding with each other at the telephoto end, unless the refracting powers of the respective lens units are weakened while the space between the principal points of the second and third lens units II and III at the wide angle end is increased. Thus, it is particularly difficult to correct astigmatism at the wide angle end and a curvature of the field at the telephoto end.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following description, the zoom lens system of the invention will be explained, by way of example but not by way of limitation, with reference to Examples 1 to 5, the lens data of which will be given later.

Figure 1:
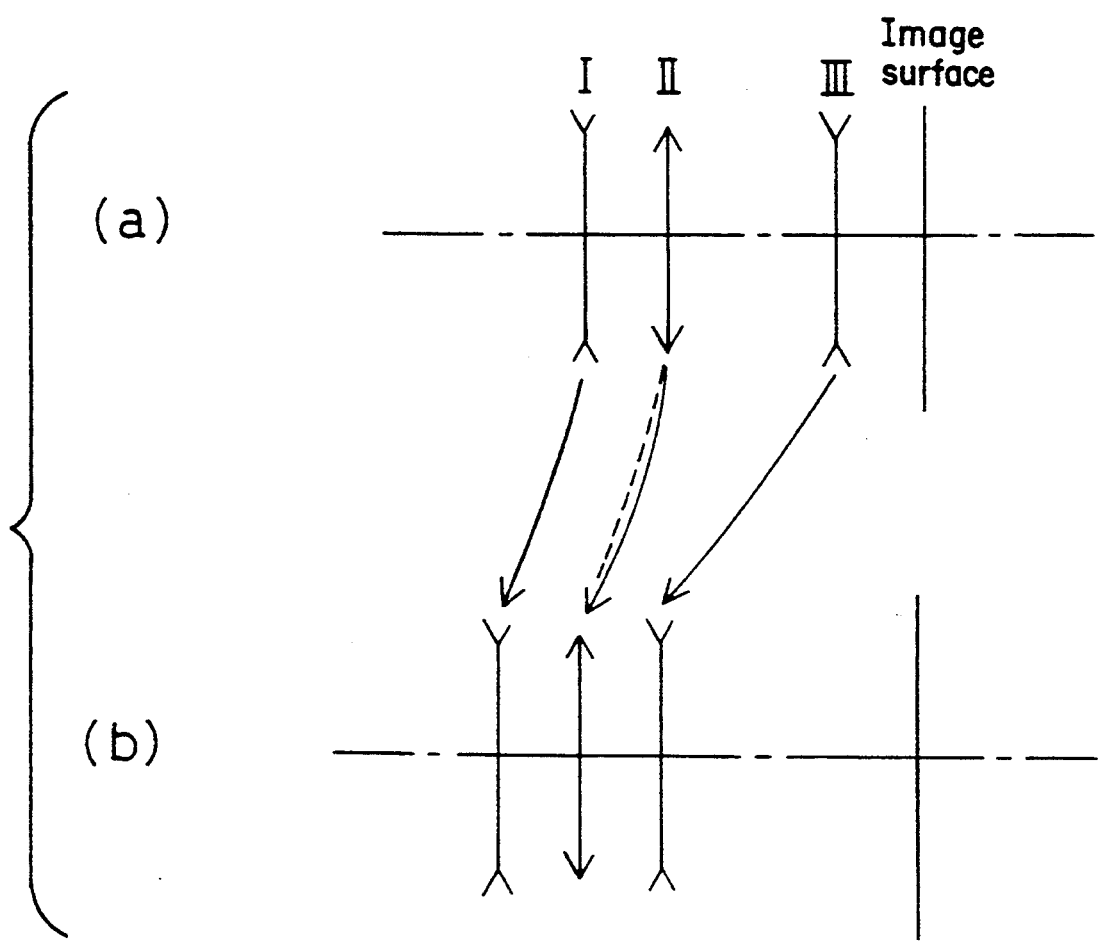
FIG. 1 illustrates the basic construction of the wide angle zoom lens system according to the invention.
Figure 2:
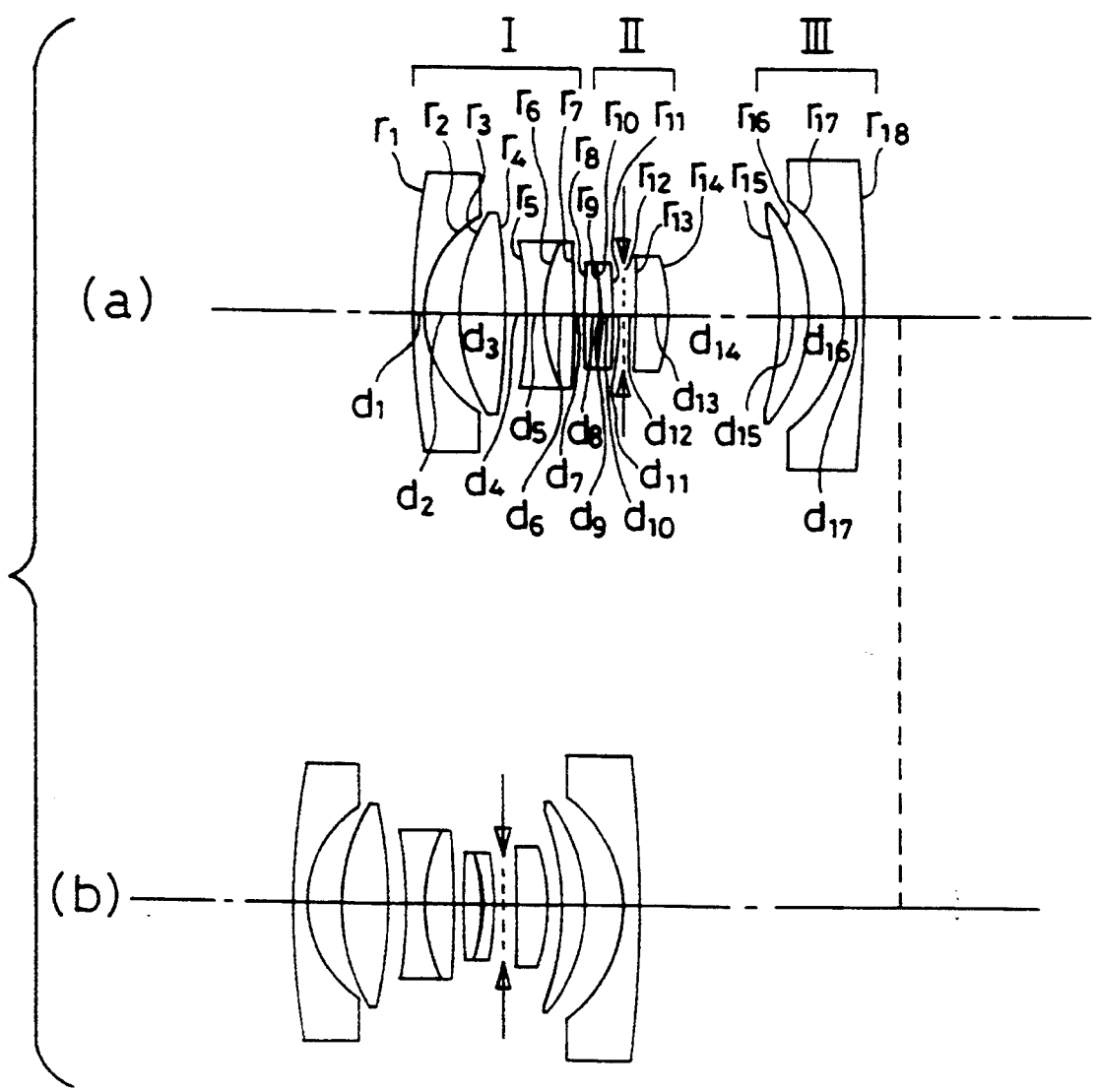
FIG. 2 represents in section the lens arrangement of Example 1 at the (a) wide angle and (b) telephoto ends.
Figure 3:
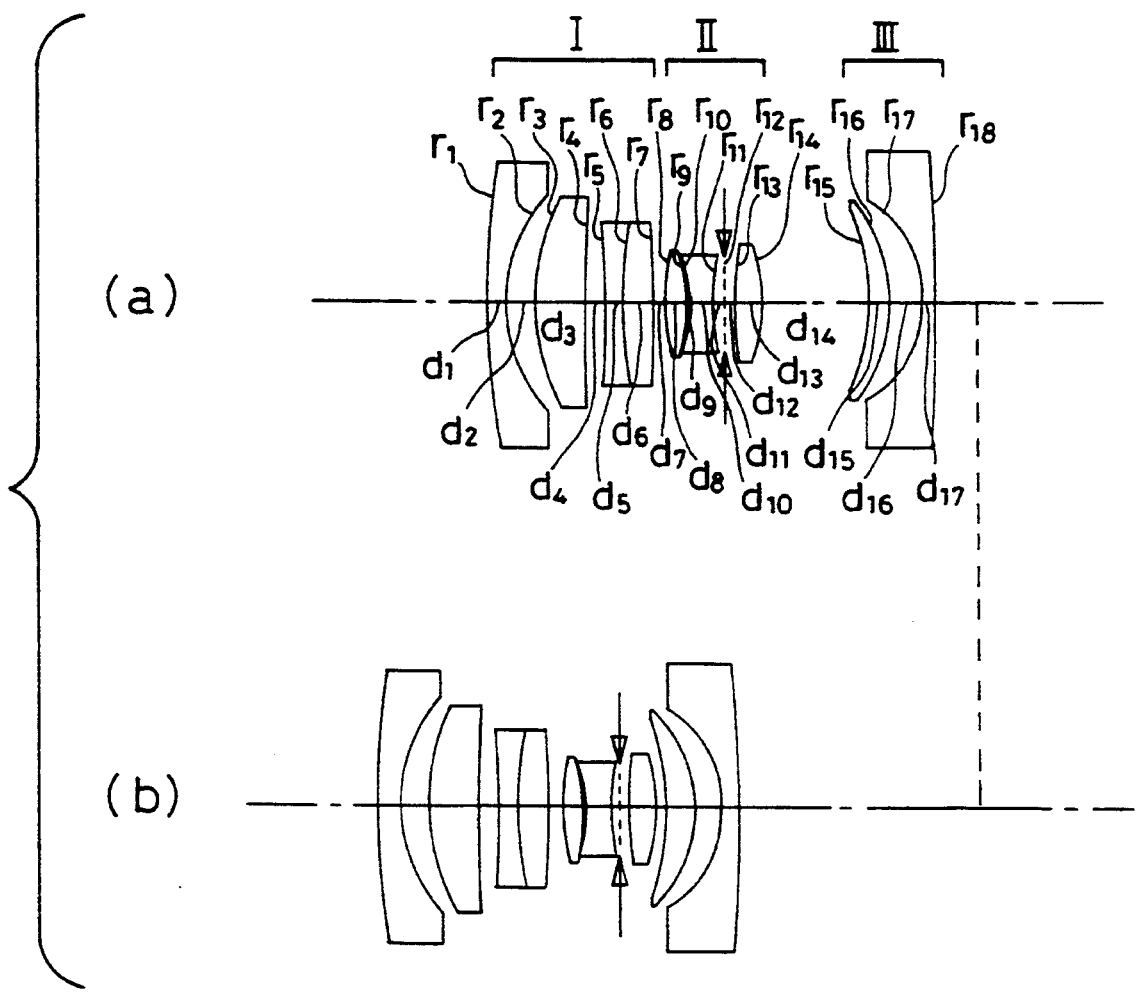
FIG. 3 is a view showing the sectional lens arrangement of Example 2 that is similar to FIG. 2.
Figure 4:
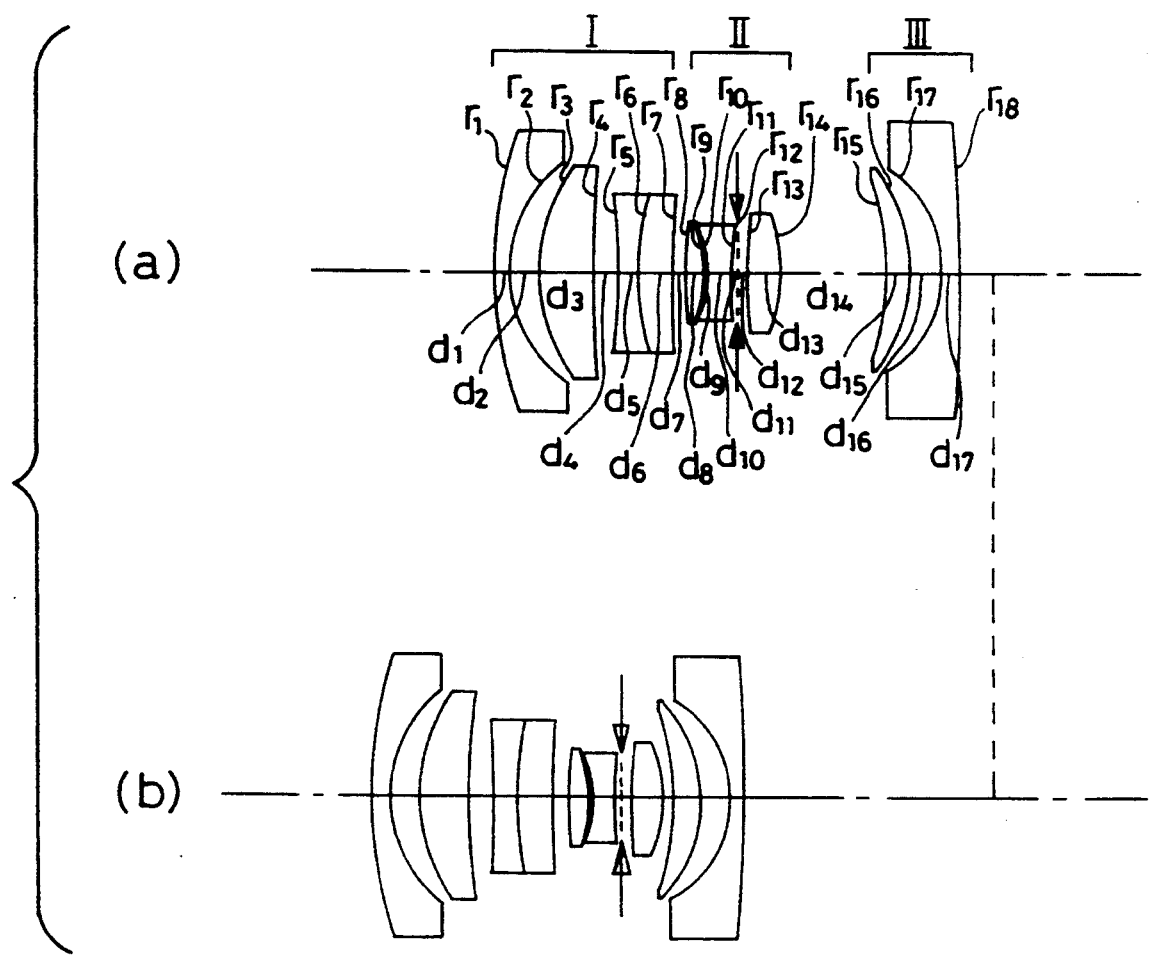
FIG. 4 is a view showing the sectional lens arrangement of Example 3 that is similar to FIG. 2.

The sectional lens arrangements of Examples 1, 2 and 3 at the (a) wide angle and (b) telephoto ends are shown in FIGS. 2, 3 and 4, respectively.

Figure 5I:
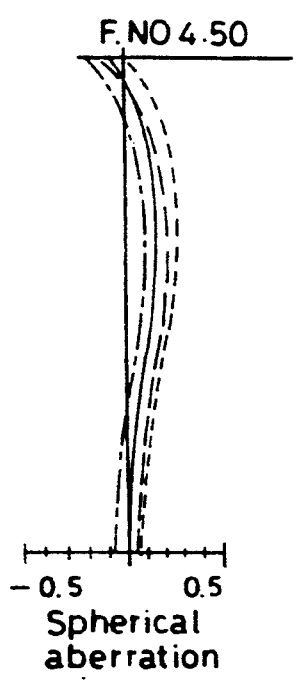
FIG. 5 is an aberration diagram showing the spherical aberration, astigmatism, distortion and chromatic aberration of magnification of Example 1 at the (a) wide angle end, (b) intermediate focal position and (c) telephoto end.
Figure 5J:
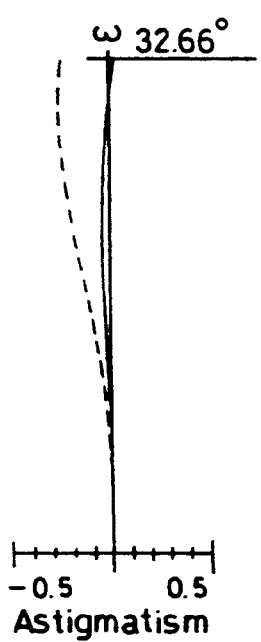
Figure 5K:
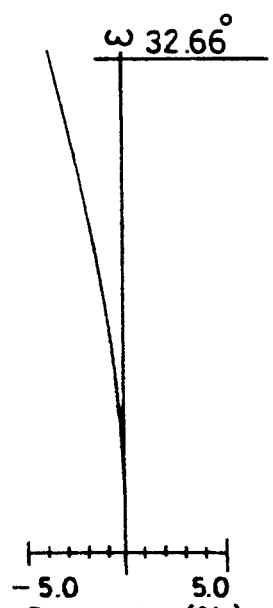
Figure 5L:
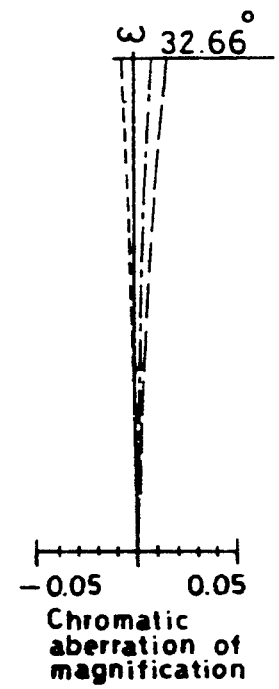
Figure 6A:
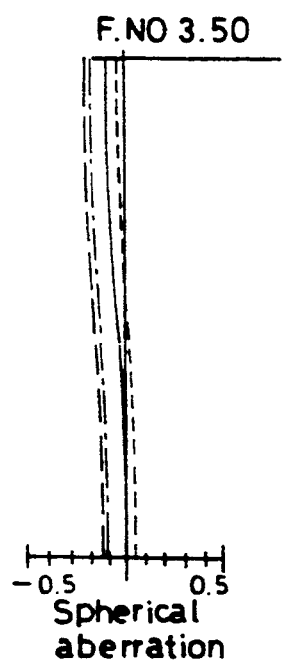
FIG. 6 is an aberration diagram of Example 2 that is similar to FIG. 5.
Figure 6B:
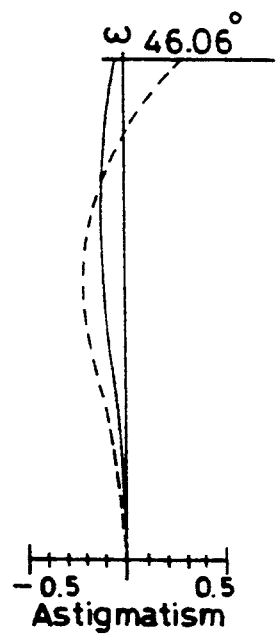
Figure 6C:
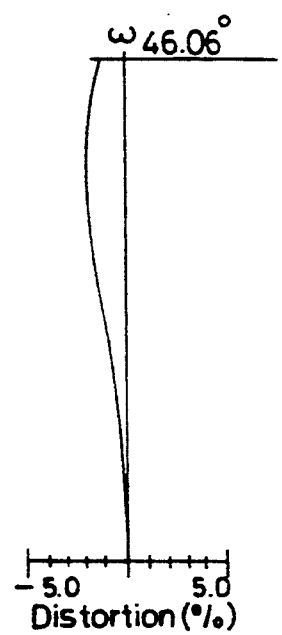
Figure 6D:
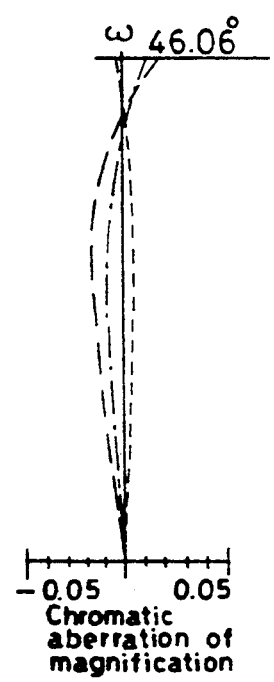
Figure 6E:
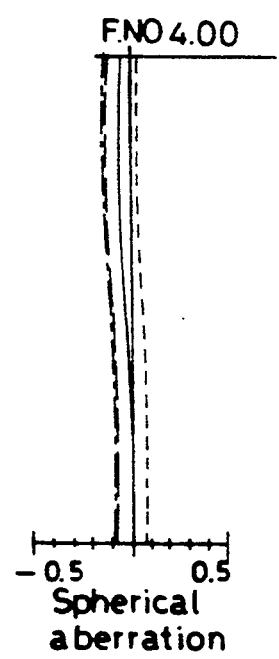
Figure 6F:
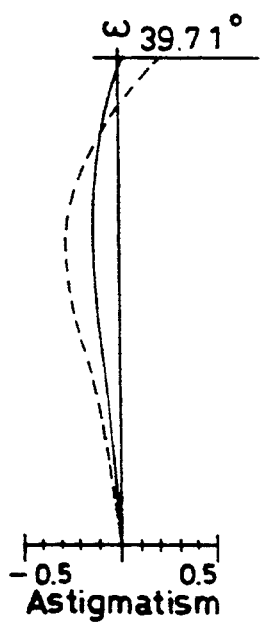
Figure 6G:
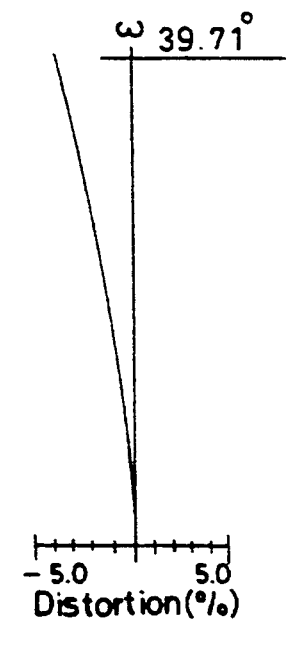
Figure 6H:
Figure 7A:
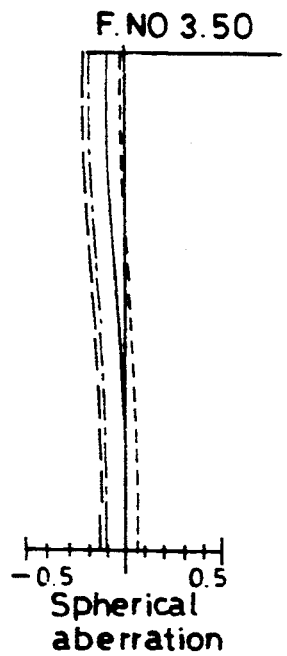
FIG. 7 is an aberration diagram of Example 3 that is similar to FIG. 5.
Figure 7B:
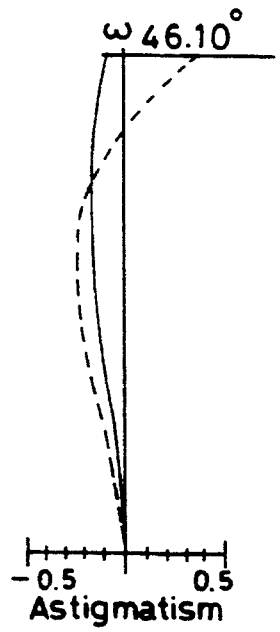
Figure 7C:
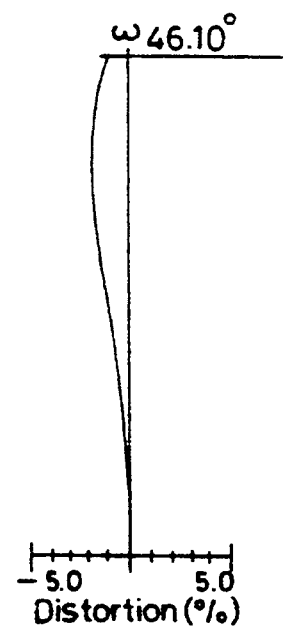
Figure 7D:
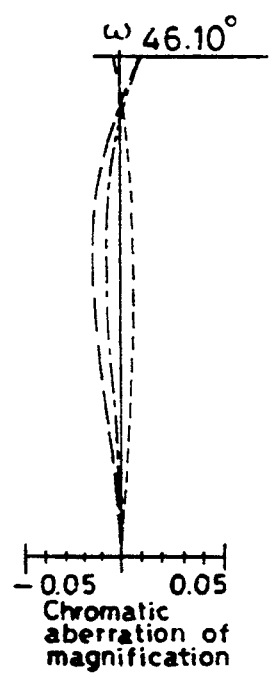
Figure 7E:
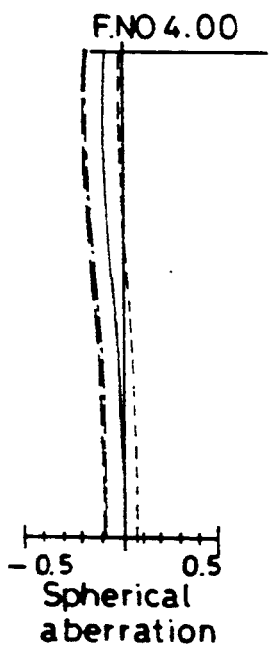
Figure 7F:
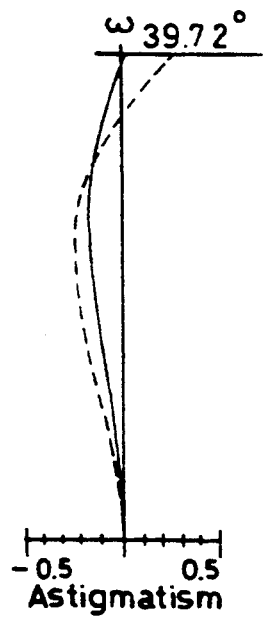
Figure 7G:
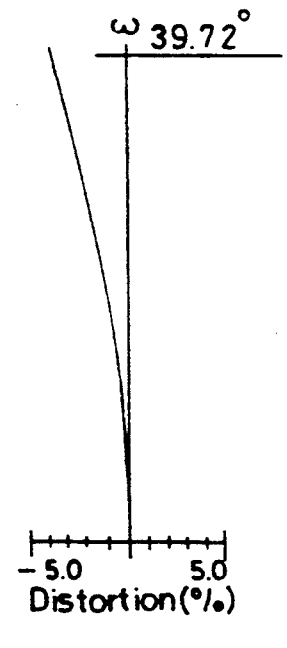
Figure 7H:
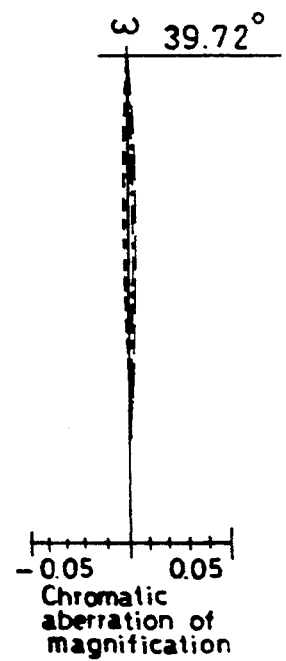
Figure 7I:
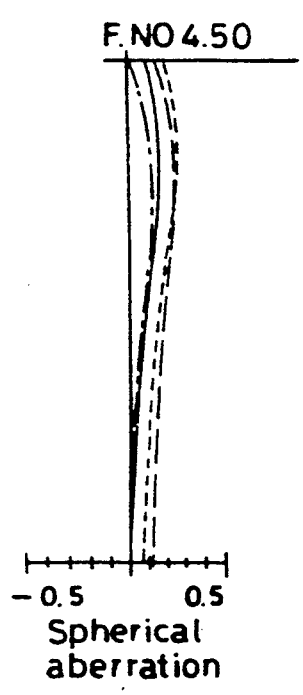
Figure 7J:
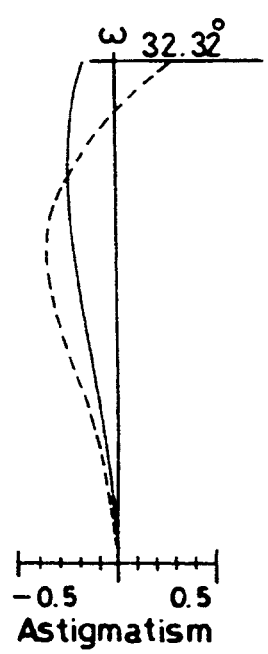
Figure 7K:
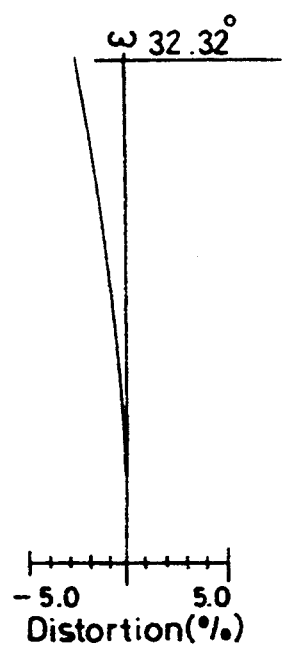
Figure 7L:
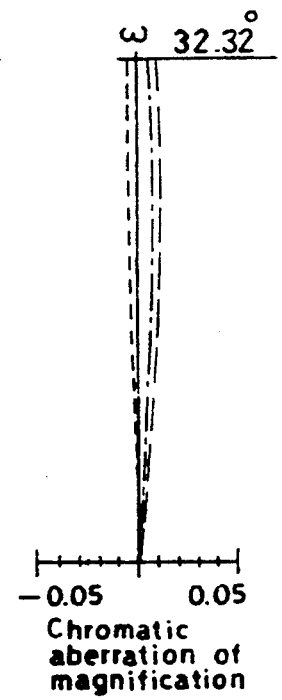
Figure 8A:
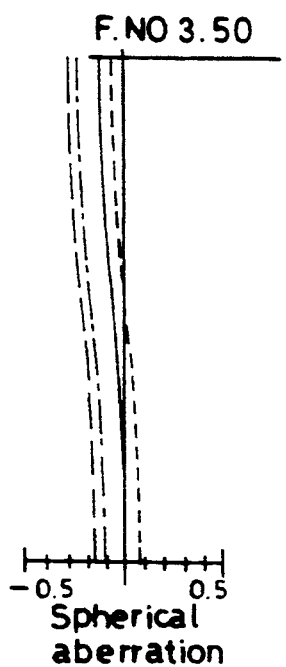
FIG. 8 is an aberration diagram of Example 4 that is similar to FIG. 5.
Figure 8B:
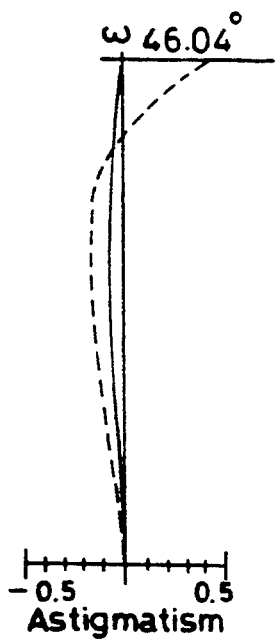
Figure 8C:
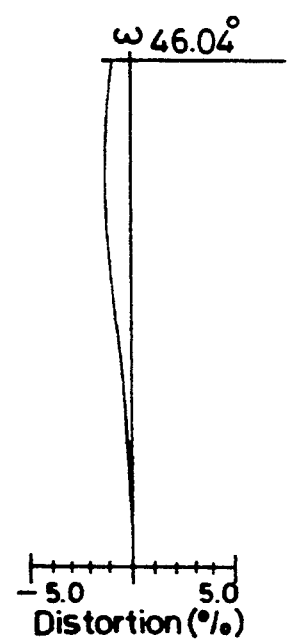
Figure 8D:
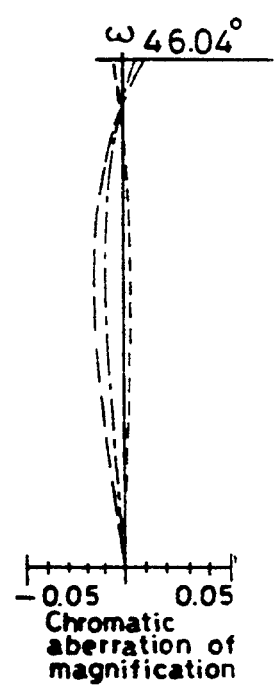
Figure 8E:
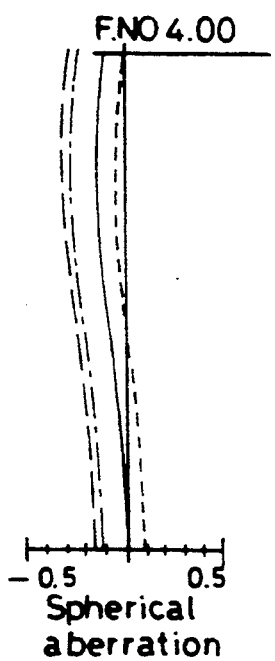
Figure 8F:
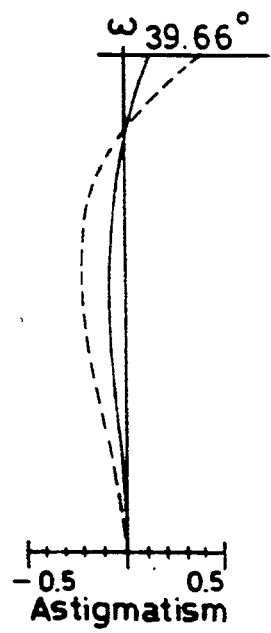
Figure 8G:
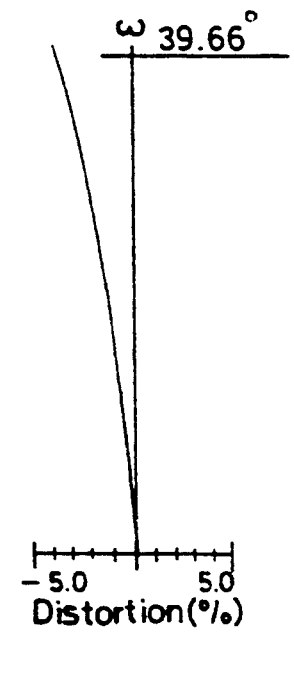
Figure 8H:
Figure 8I:
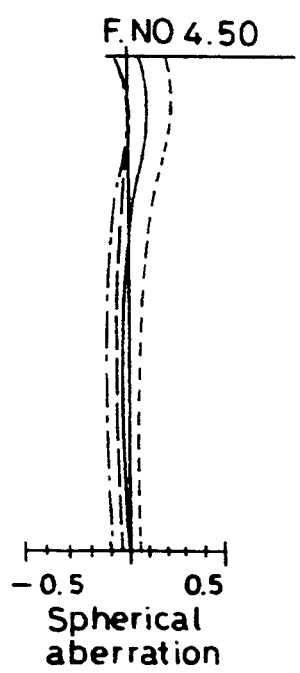
Figure 8J:
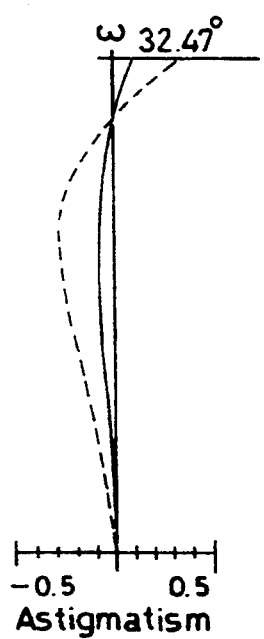
Figure 8K:
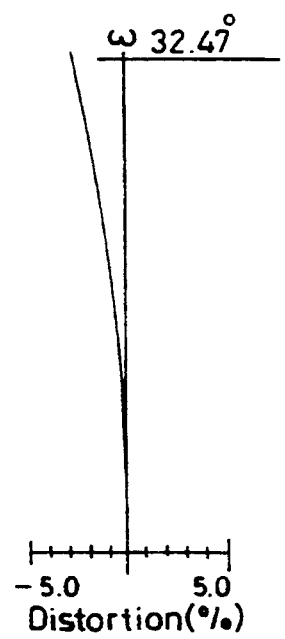
Figure 8L:
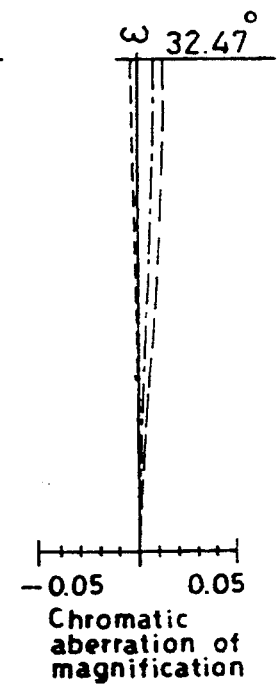
Figure 9A:
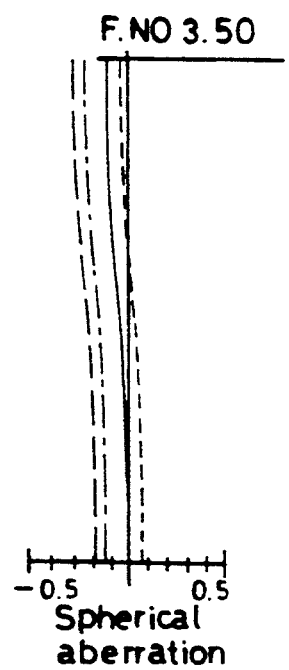
FIG. 9 is an aberration diagram of Example 5 that is similar to FIG. 5.
Figure 9B:
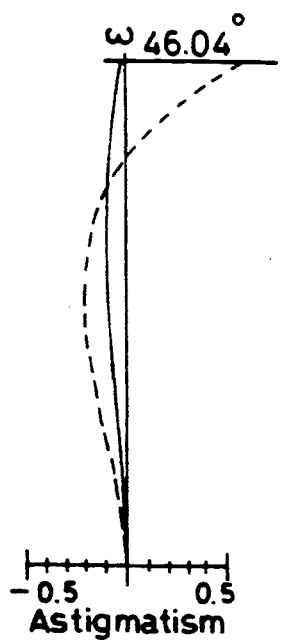
Figure 9C:
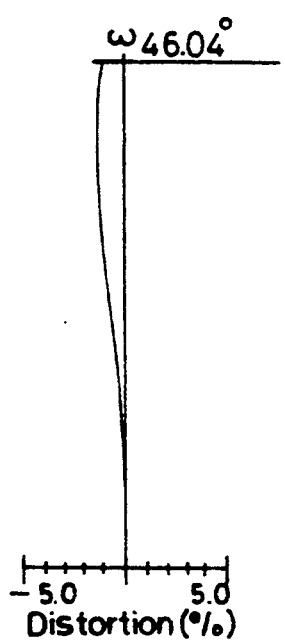
Figure 9D:
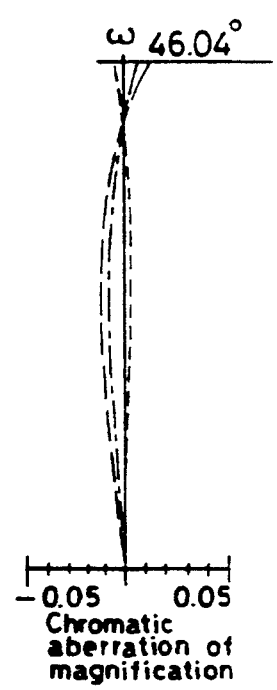
Figure 9E:
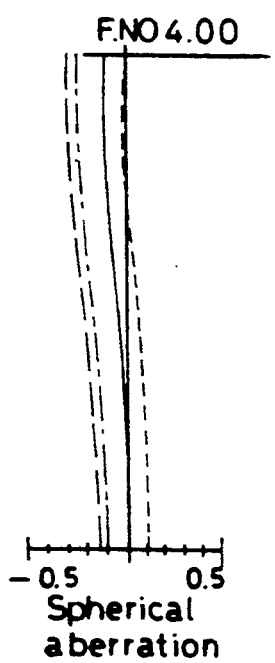
Figure 9F:
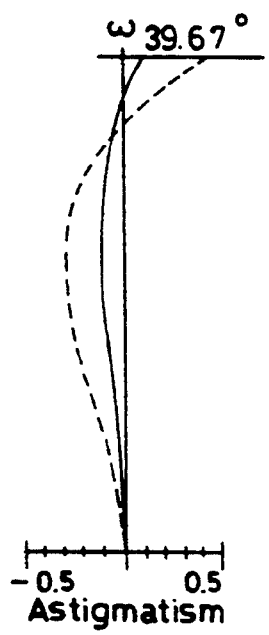
Figure 9G:
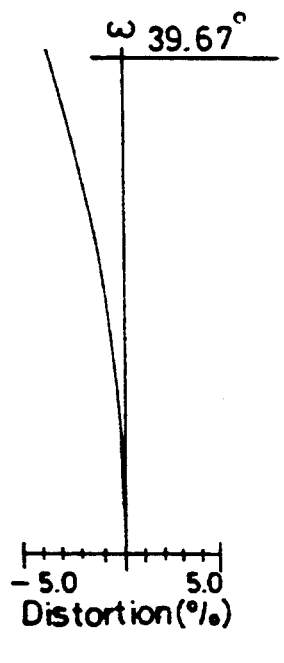
Figure 9H:
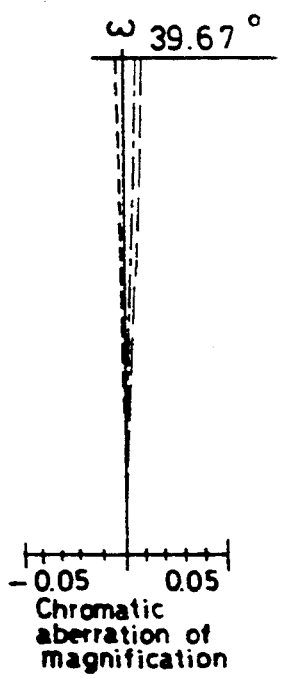
Figure 9I:
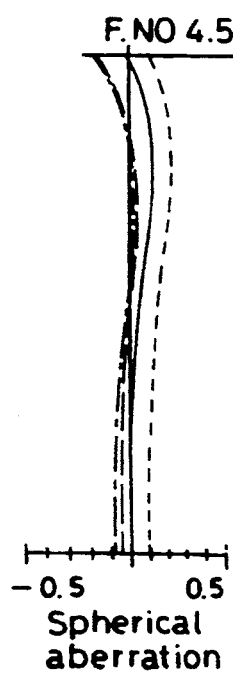
Figure 9J:
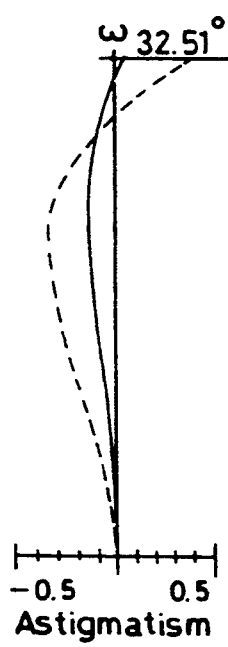
Figure 9K:
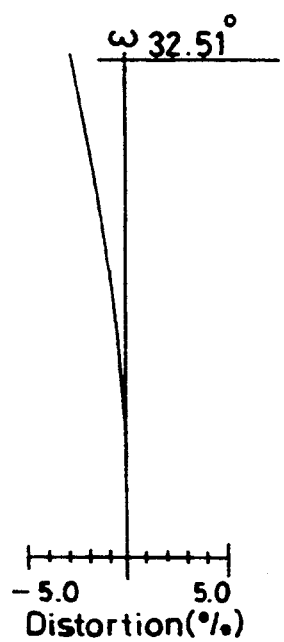
Figure 9L:
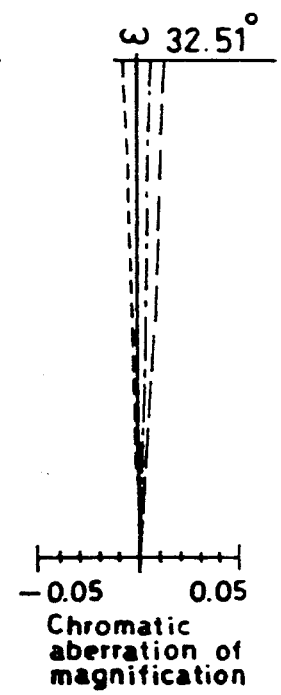

As shown in FIG. 2, the lens system of Example 1 according to the invention consists of, in order from the object side, a first lens unit I of negative refracting power, a second lens unit II of positive refracting power and a third lens unit III of negative refracting power. All the lens units I, II and III are moved toward the object side for wide angle to telephoto zooming such that the space between the first and second lens units I and II first increases and then decreases, and the space between the second and third lens units II and III decreases monotonously. To be more specific, the first lens unit I consists of, in order from the object side, a negative meniscus lens convex to the object side, a double-convex lens and a cemented lens made up of a double-concave lens and a double-convex lens; the second lens unit II consists of, in order from the object side, 60 a double-convex lens, a negative meniscus lens convex to the image side, a stop and a positive meniscus lens convex to the image side; and the third lens unit III consists of, in order from the object side, a positive meniscus lens convex to the image side and a negative meniscus lens convex to the image side. Moreover, the 1st, 14th and 16th surfaces are all in aspherical configuration, thus making well-balanced correction of aberrations from the wide angle to telephoto end. The zoom lens system of Example 1 that is constructed, as mentioned above, with the lens units moved, as mentioned above, has an ultra-wide angle coverage, as indicated by a field angle of 92° at the wide angle end, is bright, as indicated by an F-number of 3.5 to 4.5 from the wide angle to telephoto end and has a well-enough back focus, although it is relatively simple in lens and unit constructions. The spherical aberration, astigmatism, distortion and chromatic aberration of magnification of Example 1 at the wide angle end, intermediate focal position and telephoto end are shown in FIGS. 5(a), (b) and (c), which reveal that the aberrations are well corrected.

As shown in FIG. 3, the lens system of Example 2 according to the invention consists of, in order from the object side, a first lens unit I of negative refracting power, a second lens unit II of positive refracting power and a third lens unit III of negative refracting power. All the lens units I, II and III are moved toward the object side for wide angle to telephoto zooming such that the space between the first and second lens units I and II first increases and then decreases, and the space between the second and third lens units II and III decreases monotonously. To be more specific, the first lens unit I consists of, in order from the object side, a negative meniscus lens convex to the object side, a positive meniscus lens convex to the object side and a cemented lens made up of a double-concave lens and a double-convex lens; the second lens unit II consists of, in order from the object side, a double-convex lens, a double-concave lens, a stop and a double-convex lens; and the third lens unit III consists of, in order from the object side, a positive meniscus lens convex to the image side and a negative meniscus lens convex to the image side. Moreover, the 2nd, 14th and 16th surfaces are all in aspherical configuration, thus making well-balanced correction of aberrations from the wide angle to telephoto end. The zoom lens system of Example 2 that is constructed, as mentioned above, with the lens units moved, as mentioned above, has an ultra-wide angle coverage, as indicated by a field angle of 92.1° at the wide angle end, is bright, as indicated by an F-number of 3.5 to 4.5 from the wide angle to telephoto end and has a well-enough back focus, although it is relatively simple in lens and unit constructions. The spherical aberration, astigmatism, distortion and chromatic aberration of magnification of Example 1 at the wide angle end, intermediate focal position and telephoto end are shown in FIG. 6, which reveals that the aberrations are well corrected.

As shown in FIG. 4, the lens system of Example 3 according to the invention consists of, in order from the object side, a first lens unit I of negative refracting power, a second lens unit II of positive refracting power and a third lens unit III of negative refracting power. All the lens units I, II and III are moved toward the object side for wide angle to telephoto zooming such that the space between the first and second lens units I and II first increases and then decreases, and the space between the second and third lens units II and III decreases monotonously. To be more specific, the first lens unit I consists of, in order from the object side, a negative meniscus lens convex to the object side, a positive meniscus lens convex to the object side and a cemented lens made up of a double-concave lens and a positive meniscus lens convex to the object side; the second lens unit II consists of, in order from the object side, a double-convex lens, a double-concave lens, a stop and a double-convex lens; and the third lens unit III consists of, in order from the object side, a positive meniscus lens convex to the image side and a negative meniscus lens convex to the image side. In Example 3, two surfaces or the 14th and 16th surfaces are in aspherical configuration, in contrast to Example 1 or 2 wherein the three surfaces are in aspherical configuration. Hence, the amount of movement of the first lens unit I reaches a maximum and gives rise to a large variation in the total lens length, but, nonetheless, this zoom lens is compact-enough to be built in a compact camera. The zoom lens system of Example 1 that is constructed, as mentioned above, with the lens units moved, as mentioned above, has an ultra-wide angle coverage, as indicated by a field angle of 92.2° at the wide angle end, is bright, as indicated by an F-number of 3.5 to 4.5 from the wide angle to telephoto end and has a well-enough back focus, although it is relatively simple in lens and unit constructions. The spherical aberration, astigmatism, distortion and chromatic aberration of magnification of Example 1 at the wide angle end, intermediate focal position and telephoto end are shown in FIG. 7, which reveals that the aberrations are well corrected.

Example 4 of the invention is substantially similar in construction to Example 3. In contrast to Example 3 wherein the 14th and 16th surfaces are in aspherical configuration, an additional aspherical surface is applied on the 4th surface, thereby increasing the degree of freedom in correcting distortion and coma and, instead, correcting the Petzval's sum to substantially zero. For this reason and as can be seen from the aberration diagram of FIG. 8, the sagittal image surface in particular is well-enough corrected from the wide angle to telephoto end. The aberrations of Example 1 at the wide angle end, intermediate focal position and telephoto end are shown in FIG. 8, which reveals that the aberrations are well corrected.

Example 5 of the invention is substantially similar in construction to Example 3 with the exception that the first and second lenses are formed of vitreous material having a large Abbe's number in order to correct the chromatic aberration of magnification at the wide angle end in particular. As can be seen form the aberration diagram of FIG. 9, the chromatic aberration of magnification is best corrected. In Example 5, the largest back focus is achieved by increasing the refracting power of the first lens unit I and reducing the space between the first and second lens units I and II. How the aberrations of Example 5 at the wide angle end, intermediate focal position and telephoto end are corrected is shown in FIG. 9, which reveals that they are well corrected.

In the zoom lens system of the invention, it is particularly preferable that focusing is done by extending the negative lens of the first lens unit I proximate to the object side toward the object side, because the focusing mechanism involved can be simplified and aberration variations can be well reduced.

Set out below are the lens data of Examples 1-5. It is noted that symbols hereinafter used but not hereinbefore mean: f is the focal length of the overall lens system, $F_{NO}$ is the F-number, $2\omega$ is the field angle, $r_1$, $r_2$, . . . are the radii of curvature of the respective lens surfaces, $d_1$, $d_2$, . . . are the spaces between the respective lens surfaces, $n_{d1}$, $n_{d2}$, . . . are the d-line refractive indices of the respective lenses, and $\nu_{d1}$, $\nu_{d2}$, . . . are the Abbe's numbers of the respective lenses. Now letting x denote the optical axis direction and y indicate the direction normal thereto, then aspherical configuration is given by $$x = y^2/\{r+(r^2-y^2)^{\frac{1}{2}}\} + A_4 y^4 + A_6 y^6 + A_8 y^8$$

where r is the radius of curvature on the optical axis, and $A_4$, $A_6$ and $A_8$ are the aspherical coefficients.

EXAMPLE 1

| f = 21.003 ~ 27.10 ~ 34.99 | | | |
|---|---|---|---|
| $F_{NO}$ = 3.50 ~ 4.00 ~ 4.50 | | | |
| $2\omega$ = 92.02° ~ 79.42° ~ 65.32° | | | |
| $r_1$ = 59.6804 (Aspheric) | $d_1$ = 1.700 | $n_{d1}$ = 1.65160 | $\nu_{d1}$ = 58.52 |
| $r_2$ = 11.6436 | $d_2$ = 3.278 | | |
| $r_3$ = 19.2106 | $d_3$ = 4.590 | $n_{d2}$ = 1.69895 | $\nu_{d2}$ = 30.12 |
| $r_4$ = −68.7283 | $d_4$ = 2.558 | | |
| $r_5$ = −34.1093 | $d_5$ = 2.091 | $n_{d3}$ = 1.75550 | $\nu_{d3}$ = 25.07 |
| $r_6$ = 20.9693 | $d_6$ = 2.703 | $n_{d4}$ = 1.78800 | $\nu_{d4}$ = 47.83 |
| $r_7$ = −234.3802 | $d_7$ = (Variable) | | |
| $r_8$ = 113.9786 | $d_8$ = 1.686 | $n_{d5}$ = 1.69680 | $\nu_{d5}$ = 56.49 |
| $r_9$ = −22.5115 | $d_9$ = 0.245 | | |
| $r_{10}$ = −15.8817 | $d_{10}$ = 1.200 | $n_{d6}$ = 1.59270 | $\nu_{d6}$ = 35.29 |
| $r_{11}$ = −36.6614 | $d_{11}$ = 1.000 | | |
| $r_{12}$ = ∞ (Stop) | $d_{12}$ = 1.000 | | |
| $r_{13}$ = −391.1775 | $d_{13}$ = 3.629 | $n_{d7}$ = 1.69680 | $\nu_{d7}$ = 56.49 |
| $r_{14}$ = −16.8523 (Aspheric) | $d_{14}$ = (Variable) | | |
| $r_{15}$ = −28.2063 | $d_{15}$ = 2.433 | $n_{d8}$ = 1.65830 | $\nu_{d8}$ = 57.33 |
| $r_{16}$ = −17.3606 (Aspheric) | $d_{16}$ = 4.141 | | |
| $r_{17}$ = −12.2378 | $d_{17}$ = 1.700 | $n_{d9}$ = 1.69680 | $\nu_{d9}$ = 56.49 |
| $r_{18}$ = −121.9003 | | | |
| Zooming Spaces | | | |
| f | 21.03 | 27.10 | 34.99 |
| $d_7$ | 1.000 | 1.372 | 1.163 |
| $d_{14}$ | 11.568 | 5.556 | 1.000 |
| Aspherical Coefficients | | | |
| 1st surface | | | |
| $A_4$ = −0.11957 × $10^{-4}$ | | | |
| $A_6$ = 0.44268 × $10^{-7}$ | | | |
| $A_8$ = −0.42272 × $10^{-10}$ | | | |
| 14th surface | | | |
| $A_4$ = 0.38032 × $10^{-4}$ | | | |

-continued $A_6 = -0.66067 \times 10^{-7}$
$A_8 = 0.25255 \times 10^{-8}$

16th surface $A_4 = -0.15073 \times 10^{-4}$
$A_6 = 0.27241 \times 10^{-7}$
$A_8 = -0.12063 \times 10^{-8}$ $f_1/f^T = -2.666,$ $f_2/f^T = 0.545,$
$e_1{}^W/e_1{}^T = 0.992,$ $Z_2/Z_3 = 0.531,$
$e_1{}^T/f^T = 0.616,$ $f_2/f_1 = -0.204,$
$Z_1/\Delta f = 0.867,$ $Z_2/\Delta f = 0.856,$
$Z_3/\Delta f = 1.612$

EXAMPLE 2

$f = 21.01 \sim 27.10 \sim 34.99$
$F_{NO} = 3.50 \sim 4.00 \sim 4.50$
$2\omega = 92.12° \sim 79.42° \sim 65.02°$

| | | | |
|---|---|---|---|
| $r_1 = 102.2863$ | $d_1 = 2.048$ | $n_{d1} = 1.65160$ | $\nu_{d1} = 58.52$ |
| $r_2 = 15.7687$ (Apsheric) | $d_2 = 3.100$ | | |
| $r_3 = 23.6680$ | $d_3 = 5.424$ | $n_{d2} = 1.69895$ | $\nu_{d2} = 30.12$ |
| $r_4 = 381.9039$ | $d_4 = 2.147$ | | |
| $r_5 = -79.2014$ | $d_5 = 1.839$ | $n_{d3} = 1.75550$ | $\nu_{d3} = 25.07$ |
| $r_6 = 44.9416$ | $d_6 = 3.494$ | $n_{d4} = 1.78800$ | $\nu_{d4} = 47.38$ |
| $r_7 = -105.1354$ | $d_7 = $ (Variable) | | |
| $r_8 = 24.2789$ | $d_8 = 2.106$ | $n_{d5} = 1.69680$ | $\nu_{d5} = 56.49$ |
| $r_9 = -33.2704$ | $d_9 = 0.394$ | | |
| $r_{10} = -16.8552$ | $d_{10} = 3.119$ | $n_{d6} = 1.59270$ | $\nu_{d6} = 35.29$ |
| $r_{11} = 32.5483$ | $d_{11} = 0.470$ | | |
| $r_{12} = \infty$ (Stop) | $d_{12} = 1.000$ | | |
| $r_{13} = 70.9693$ | $d_{13} = 3.409$ | $n_{d7} = 1.69680$ | $\nu_{d7} = 56.49$ |
| $r_{14} = -14.6882$ (Aspheric) | $d_{14} = $ (Variable) | | |
| $r_{15} = -27.0589$ | $d_{15} = 2.579$ | $n_{d8} = 1.65830$ | $\nu_{d8} = 57.33$ |
| $r_{16} = -16.3183$ (Aspheric) | $d_{16} = 3.312$ | | |
| $r_{17} = -11.6250$ | $d_{17} = 1.700$ | $n_{d9} = 1.69680$ | $\nu_{d9} = 56.49$ |
| $r_{18} = -135.7542$ | | | |

Zooming Spaces

| f | 21.01 | 27.10 | 34.99 |
|---|---|---|---|
| $d_7$ | 1.000 | 2.206 | 1.366 |
| $d_{14}$ | 10.606 | 5.098 | 1.000 |

Aspherical Coefficients

2nd surface $A_4 = 0.10820 \times 10^{-4}$
$A_6 = 0.70608 \times 10^{-8}$
$A_8 = 0.23884 \times 10^{-9}$ 14th surface $A_4 = 0.53561 \times 10^{-4}$
$A_6 = 0.13601 \times 10^{-6}$
$A_8 = 0.10000 \times 10^{-8}$ 16th surface $A_4 = 0.25693 \times 10^{-4}$
$A_6 = 0.78095 \times 10^{-8}$
$A_8 = 0.16208 \times 10^{-8}$ $f_1/f^T = -5.369,$ $f_2/f^T = 0.564,$
$e_1{}^W/e_1{}^T = 0.990,$ $Z_2/Z_3 = 0.555,$
$e_1{}^T/f^T = 1.059,$ $f_2/f_1 = -0.105,$
$Z_1/\Delta f = 0.884,$ $Z_2/\Delta f = 0.858,$
$Z_3/\Delta f = 1.545$

EXAMPLE 3

$f = 20.99 \sim 27.11 \sim 34.98$
$F_{NO} = 3.50 \sim 4.00 \sim 4.50$
$2\omega = 92.20° \sim 79.42° \sim 6464°$

| | | | |
|---|---|---|---|
| $r_1 = 47.2009$ | $d_1 = 1.711$ | $n_{d1} = 1.65160$ | $\nu_{d1} = 58.52$ |
| $r_2 = 13.0061$ | $d_2 = 3.147$ | | |
| $r_3 = 19.7352$ | $d_3 = 5.639$ | $n_{d2} = 1.69895$ | $\nu_{d2} = 30.12$ |
| $r_4 = 117.8357$ | $d_4 = 2.263$ | | |
| $r_5 = -139.6521$ | $d_5 = 2.461$ | $n_{d3} = 1.75550$ | $\nu_{d3} = 25.07$ |
| $r_6 = 28.9410$ | $d_6 = 3.840$ | $n_{d4} = 1.78800$ | $\nu_{d4} = 47.38$ |
| $r_7 = 235.2346$ | $d_7 = $ (Variable) | | |
| $r_8 = 31.0843$ | $d_8 = 1.954$ | $n_{d5} = 1.69680$ | $\nu_{d5} = 56.49$ |
| $r_9 = -27.4786$ | $d_9 = 0.366$ | | |

-continued

| | | | |
|---|---|---|---|
| $r_{10} = -15.2087$ | $d_{10} = 3.017$ | $n_{d6} = 1.59270$ | $\nu_{d6} = 35.29$ |
| $r_{11} = 73.5809$ | $d_{11} = 0.165$ | | |
| $r_{12} = \infty$ (Stop) | $d_{12} = 1.000$ | | |
| $r_{13} = 70.3566$ | $d_{13} = 3.848$ | $n_{d7} = 1.69680$ | $\nu_{d7} = 56.49$ |
| $r_{14} = -14.3674$ (Aspheric) | $d_{14} = $ (Variable) | | |
| $r_{15} = -31.3834$ | $d_{15} = 2.655$ | $n_{d8} = 1.65830$ | $\nu_{d8} = 57.33$ |
| $r_{16} = -17.8283$ (Aspheric) | $d_{16} = 3.282$ | | |
| $r_{17} = -12.0595$ | $d_{17} = 1.700$ | $n_{d9} = 1.69680$ | $\nu_{d9} = 56.49$ |
| $r_{18} = -182.1759$ | | | |

Zooming Spaces

| f | 20.99 | 27.11 | 34.98 |
|---|---|---|---|
| $d_7$ | 1.000 | 2.267 | 1.415 |
| $d_{14}$ | 10.814 | 4.996 | 1.000 |

Aspherical Coefficients

14th surface
$A_4 = 0.62703 \times 10^{-4}$
$A_6 = 0.18438 \times 10^{-6}$
$A_8 = 0.10000 \times 10^{-8}$ 16th surface
$A_4 = 0.26148 \times 10^{-4}$
$A_6 = 0.90155 \times 10^{-7}$
$A_8 = 0.91176 \times 10^{-9}$ $f_1/f^T = -2.457$, $f_2/f^T = 0.514$,
$e_1^W/e_1^T = 0.977$, $Z_2/Z_3 = 0.557$,
$e_1^T/f^T = 0.513$, $f_2/f_1 = -0.208$,
$Z_1/\Delta f = 0.912$, $Z_2/\Delta f = 0.882$,
$Z_3/\Delta f = 1.584$

EXAMPLE 4

$f = 21.00 \sim 27.14 \sim 34.97$
$F_{NO} = 3.50 \sim 4.00 \sim 4.50$
$2\omega = 92.08° \sim 79.32° \sim 64.94°$

| | | | |
|---|---|---|---|
| $r_1 = 69.6443$ | $d_1 = 1.436$ | $n_{d1} = 1.61800$ | $\nu_{d1} = 63.38$ |
| $r_2 = 12.9668$ | $d_2 = 3.288$ | | |
| $r_3 = 20.8926$ | $d_3 = 6.248$ | $n_{d2} = 1.74950$ | $\nu_{d2} = 35.27$ |
| $r_4 = 263.2791$ (Aspheric) | $d_4 = 2.653$ | | |
| $r_5 = -117.3382$ | $d_5 = 3.283$ | $n_{d3} = 1.75084$ | $\nu_{d3} = 27.69$ |
| $r_6 = 23.6504$ | $d_6 = 3.401$ | $n_{d4} = 1.75500$ | $\nu_{d4} = 52.33$ |
| $r_7 = 202.2146$ | $d_7 = $ (Variable) | | |
| $r_8 = 27.3953$ | $d_8 = 1.972$ | $n_{d5} = 1.69680$ | $\nu_{d5} = 56.49$ |
| $r_9 = 27.5100$ | $d_9 = 0.357$ | | |
| $r_{10} = -15.7594$ | $d_{10} = 2.418$ | $n_{d6} = 1.59551$ | $\nu_{d6} = 39.21$ |
| $r_{11} = 94.4882$ | $d_{11} = 0.130$ | | |
| $r_{12} = \infty$ (Stop) | $d_{12} = 1.000$ | | |
| $r_{13} = 120.1289$ | $d_{13} = 3.321$ | $n_{d7} = 1.69680$ | $\nu_{d7} = 56.49$ |
| $r_{14} = -14.6566$ (Aspheric) | $d_{14} = $ (Variable) | | |
| $r_{15} = -26.0544$ | $d_{15} = 2.556$ | $n_{d8} = 1.65830$ | $\nu_{d8} = 57.33$ |
| $r_{16} = -16.2028$ (Aspheric) | $d_{16} = 3.454$ | | |
| $r_{17} = -11.3280$ | $d_{17} = 1.700$ | $n_{d9} = 1.67000$ | $\nu_{d9} = 57.33$ |
| $r_{18} = -127.9150$ | | | |

Zooming Spaces

| f | 21.00 | 27.14 | 34.97 |
|---|---|---|---|
| $d_7$ | 1.000 | 1.722 | 1.181 |
| $d_{14}$ | 10.573 | 4.971 | 1.000 |

Aspherical Coefficients

4th surface
$A_4 = 0.26187 \times 10^{-5}$
$A_6 = 0.33113 \times 10^{-7}$
$A_8 = 0.15797 \times 10^{-9}$ 14th surface
$A_4 = 0.50010 \times 10^{-4}$
$A_6 = 0.69985 \times 10^{-6}$
$A_8 = 0.97325 \times 10^{-8}$ 16th surface
$A_4 = 0.25331 \times 10^{-4}$
$A_6 = 0.28433 \times 10^{-7}$
$A_8 = 0.23903 \times 10^{-8}$ $f_1/f^T = -2.254$, $f_2/f^T = 0.510$,
$e_1^W/e_1^T = 0.990$, $Z_2/Z_3 = 0.565$,
$e_1^T/f^T = 0.509$, $f_2/f_1 = -0.226$,
$Z_1/\Delta f = 0.904$, $Z_2/\Delta f = 0.891$, -continued $Z_3/\Delta f = 1.576$

EXAMPLE 5

$f = 21.06 \sim 27.16 \sim 34.93$
$F_{NO} = 3.50 \sim 4.00 \sim 4.50$
$2\omega = 92.08° \sim 79.34° \sim 65.02°$

| | | | |
|---|---|---|---|
| $r_1 = 71.1669$ | $d_1 = 1.436$ | $n_{d1} = 1.61800$ | $\nu_{d1} = 63.38$ |
| $r_2 = 12.9482$ | $d_2 = 3.288$ | | |
| $r_3 = 20.6727$ | $d_3 = 6.249$ | $n_{d2} = 1.74950$ | $\nu_{d2} = 35.27$ |
| $r_4 = 248.0873$ | $d_4 = 2.653$ | | |
| $r_5 = -114.3630$ | $d_5 = 3.284$ | $n_{d3} = 1.75084$ | $\nu_{d3} = 27.69$ |
| $r_6 = 24.0534$ | $d_6 = 3.402$ | $n_{d4} = 1.75500$ | $\nu_{d4} = 52.33$ |
| $r_7 = 195.9447$ | $d_7 = $ (Variable) | | |
| $r_8 = 27.3467$ | $d_8 = 1.973$ | $n_{d5} = 1.69680$ | $\nu_{d5} = 56.49$ |
| $r_9 = -27.3019$ | $d_9 = 0.355$ | | |
| $r_{10} = -15.7135$ | $d_{10} = 2.418$ | $n_{d6} = 1.59551$ | $\nu_{d6} = 39.21$ |
| $r_{11} = 94.0988$ | $d_{11} = 0.129$ | | |
| $r_{12} = \infty$ (Stop) | $d_{12} = 1.000$ | | |
| $r_{13} = 118.4976$ | $d_{13} = 3.321$ | $n_{d7} = 1.69680$ | $\nu_{d7} = 56.49$ |
| $r_{14} = -14.6767$ (Aspheric) | $d_{14} = $ (Variable) | | |
| $r_{15} = -26.0254$ | $d_{15} = 2.559$ | $n_{d8} = 1.65830$ | $\nu_{d8} = 57.33$ |
| $r_{16} = -16.1982$ | $d_{16} = 3.454$ | | |
| $r_{17} = -11.3930$ | $d_{17} = 1.700$ | $n_{d9} = 1.6700$ | $\nu_{d9} = 57.33$ |
| $r_{18} = -129.4054$ | | | |

Zooming Spaces

| f | 21.06 | 27.16 | 34.93 |
|---|---|---|---|
| $d_7$ | 1.000 | 1.721 | 1.185 |
| $d_{14}$ | 10.570 | 4.968 | 1.000 |

Aspherical Coefficients

14th surface
$A_4 = 0.58865 \times 10^{-4}$
$A_6 = 0.18619 \times 10^{-6}$
$A_8 = 0.10000 \times 10^{-8}$ 16th surface
$A_4 = 0.22549 \times 10^{-4}$
$A_6 = 0.36012 \times 10^{-7}$
$A_8 = 0.18034 \times 10^{-8}$ $f_1/f^T = -2.200,$  $f_2/f^T = 0.510,$
$e_1^W/e_1^T = 0.989,$  $Z_2/Z_3 = 0.565,$
$e_1^T/f^T = 0.503,$  $f_2/f_1 = -0.232,$
$Z_1/\Delta f = 0.909,$  $Z_2/\Delta f = 0.896,$
$Z_3/\Delta f = 1.586$ As can be understood from the foregoing, the present invention successfully provides an ultra-wide angle zoom lens system that has a very wide angle coverage, as indicated by a field angle change by zooming of about 92° to about 65°, is bright, as indicated by a F-number of 4.5 at the telephoto end and is relatively simple in lens unit construction.

What we claim is:

1. A wide angle zoom lens system, consisting of, in order from an object side, a first lens unit of negative refracting power, a second lens unit of positive refracting power and a third lens unit of negative refracting power, all said lens units being moved relative to an image plane to the object side for wide-angle-to-telephoto zooming, and which satisfies the following conditional formulae (1), (2) and (3):

$$-6.5 < f_1/f^T < -1.5 \quad (1)$$

$$0.4 < f_2/f^T < 1.0 \quad (2)$$

$$0.8 < e_1^W/e_1^T < 1.2 \quad (3)$$

where $f_1$ and $f_2$ are the focal lengths of the first and second lens units, respectively, $f^T$ is the focal length of the overall lens system at the telephoto end, and $e_1^W$ and $e_1^T$ are the spaces between the principal points off the first and second lens units at a wide angle and telephoto ends, respectively, wherein the space between the first and second lens units is varied during said wide-angle-to-telephoto zooming.

2. A wide angle zoom lens system as claimed in claim 1, wherein the first, second and third lens units are moved for said wide-angle-to-telephoto zooming such that the space between the first and second lens units increases from the wide angle end until an extreme point, whereafter the space decreases until the telephoto end is reached.

3. A wide angle zoom lens as claimed in claim 2, which further satisfies the following conditions (4), (5) and (6):

$$0.4 < Z_2/Z_3 < 0.6 \quad (4)$$

$$0.3 < e_1^T/f^T < 1.5 \quad (5)$$

$$-0.25 < f_2/f_1 < -0.07 \quad (6)$$

where $Z_2$ and $Z_3$ are the amounts of movement of the second and third lens units during wide angle to telephoto zooming, respectively.

4. A wide angle zoom lens system as claimed in claim 1 or 2, which further satisfies the following conditions (7), (8) and (9):

$$0.75 < Z_1/\Delta f < 1.3 \tag{7}$$

$$0.75 < Z_2/\Delta f < 1.3 \tag{8}$$

$$1.1 < Z_3/\Delta f < 2.0 \tag{9}$$

where $Z_i$ is the amount of movement of the i-th lens unit for wide angle to telephoto zooming, and $\Delta f$ is the amount of a focal length change from the wide angle to telephoto end or $\Delta f = f^T - f^W$ where $f^W$ is the focal length of the overall lens system at the wide angle.

5. A wide angle zoom lens system as claimed in claim 3, which further satisfies to the following conditions (7), (8) and (9):

$$0.75 < Z_1/\Delta f < 1.3 \tag{7}$$

$$0.75 < Z_2/\Delta f < 1.3 \tag{8}$$

$$1.1 < Z_3/\Delta f < 2.0 \tag{9}$$

where $Z_i$ is the amount of movement of the i-th lens unit for wide-angle-to-telephoto zooming, and $\Delta f$ is the amount of a focal length change from the wide angle to telephoto end or $\Delta f = f^T - f^W$ where $f^W$ is the focal length of the overall lens system at the wide angle.

* * * * *